US006817482B1

(12) United States Patent
Borter

(10) Patent No.: US 6,817,482 B1
(45) Date of Patent: Nov. 16, 2004

(54) BOTTLED GAS VALVE SAFETY SHIELD APPARATUS

(76) Inventor: Thomas W. Borter, 406 S. Rockford #7, Tempe, AZ (US) 85281

( * ) Notice: Subject to any disclaimer, the term of this patent is extended or adjusted under 35 U.S.C. 154(b) by 133 days.

(21) Appl. No.: 10/200,623

(22) Filed: Jul. 23, 2002

(51) Int. Cl.$^7$ ................................. F16K 35/00
(52) U.S. Cl. ...................... 220/725; 137/382
(58) Field of Search ................ 220/725, 724, 220/726, 727, 728; 138/382, 383; 22/724

(56) References Cited

U.S. PATENT DOCUMENTS 4,380,247 A * 4/1983 Douglas ..................... 137/382
4,513,773 A * 4/1985 Hardiman, Jr. ............. 137/382

* cited by examiner

Primary Examiner—Joseph Man-Fu Moy
(74) Attorney, Agent, or Firm—H. Gordon Shields

(57) ABSTRACT

Safety shield apparatus for a bottled gas tank valve includes a cover which fits over the valve and an internal flange or plate within the cover that fits underneath the valve handle. A tail portion secured to the cover extends outwardly beyond the vertically extending flange which is disposed arcuately about the valve handle and which comprises also a handle for the bottle. The tail portion includes holes which receive a lock to prevent the shield apparatus from being removed from the bottled gas tank.

14 Claims, 1 Drawing Sheet

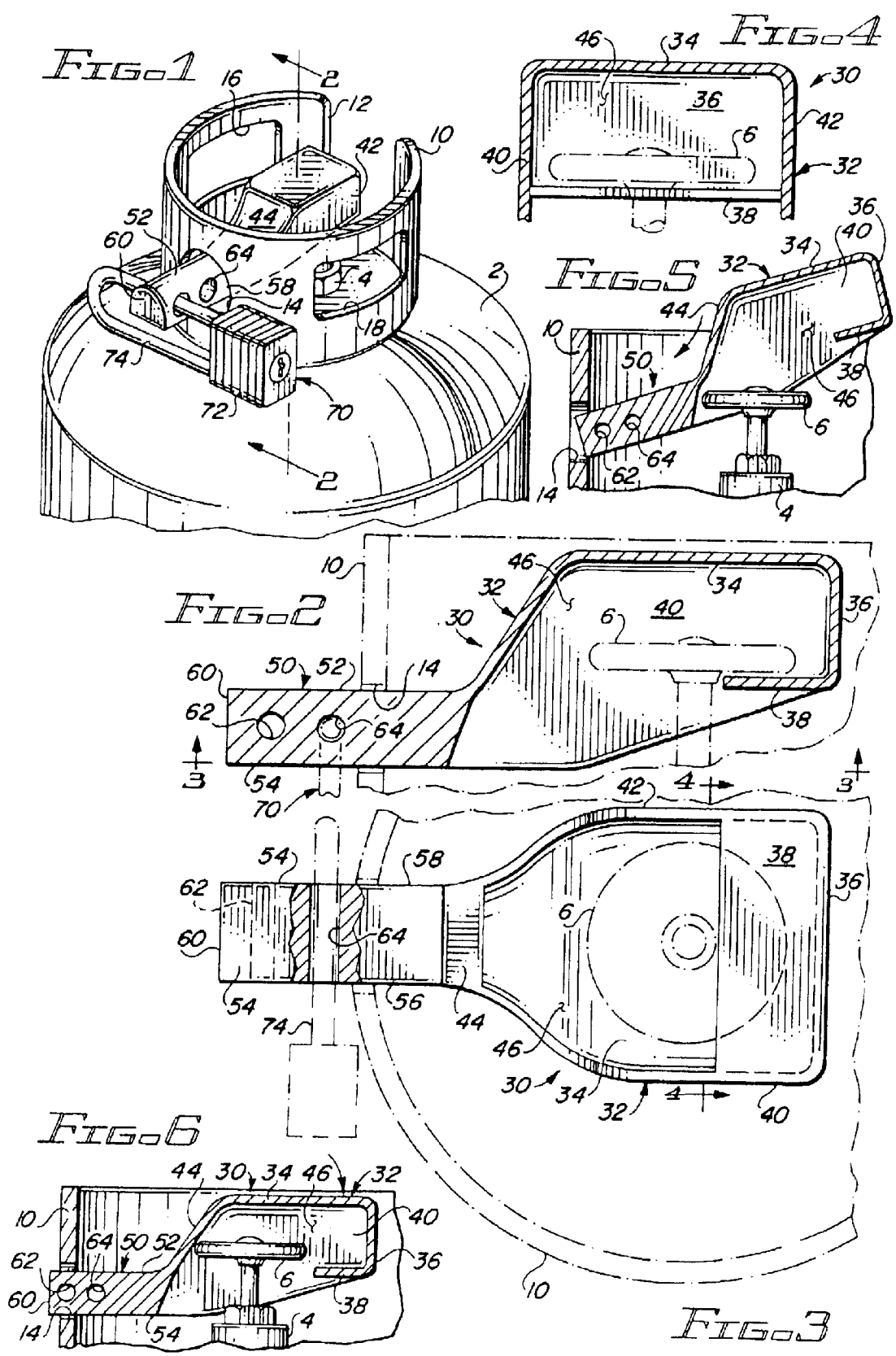

BOTTLED GAS VALVE SAFETY SHIELD APPARATUS

BACKGROUND OF THE INVENTION

1. Field of the Invention

This invention relates to bottled gas tank valves and, more particularly, to a safety shield for a bottled gas tank valve.

2. Description of the Prior Art

Tanks of bottled gas, such as propane tanks, typically used for portable grills and the like, generally include a generally vertically extending protective flange or shield disposed about the valve. The valve is, of course, on the top of the tank. The shield generally extends about the valve for more than 180 degrees, and the shield typically includes three slots. The slots are hand holds for the purpose of carrying the tank.

The shield disposed about the valve generally prevents accidental damage to the valve itself, but does not prevent the valve from being turned on. In contemporary valves, there is generally an O ring sealing element about the valve stem. The O ring seal takes the place of metal to metal seals which were typical of the valves in past years. The metal to metal seal was occasioned, of course, by the brass metal used in the valve. The use of the O ring seal reduces the cost of the valve since it is no longer necessary to have the relatively close tolerances which formerly were involved in the metal to metal seals. With the metal to metal seals, the valves could be closed rather tightly, with the amount of force required to open the valves probably exceeding the strength of children. However, with the O ring type seal in the valves, it is virtually impossible to hand tighten a valve sufficiently to prevent a child from opening the valve.

Since propane is the type of bottled gas generally used, propane tanks and gas will generally be referred to hereafter. However, it will be understood that any type of liquefied bottled gas may use the apparatus of the present invention.

A typical problem involving children is simply that a child may turn on the valve of the bottled gas tank and then the gas may flow through the unit to which it is connected, such as a grill, or the like. If the gas is not ignited substantially coincidentally with the turning on of the valve, there is a potential problem of an explosion of some type and the possible injury to a child, and to anyone else nearby. The primary problem is, of course, a child being involved with the tuning on of the tank valve and with the lighting of a burner on a propane stove or grill to which the tank is connected.

Piezoelectric igniter elements have been used in the last several years in conjunction with gas stoves and grills. The piezoelectric elements are normally built into the burner units. A person typically turns on the gas valve and then pushes the piezoelectric igniter handle to light a propane burner. If there is a problem with igniter, then the gas will not be immediately lit. The gas valve may be left on by a child, and the flowing unlit gas obviously is a potential fire and explosion hazard. There may also be other problems associated with the propane gas flowing from the tank and stove or grill.

The apparatus of the present invention provides a safety guard to prevent a child from turning on a propane tank valve. The guard apparatus of the present invention prevents the valve from being opened by anyone other than an authorized person, or one who has either a key or a combination to a lock which secures the guard to a propane tank.

SUMMARY OF THE INVENTION

The invention described and claimed herein comprises a safety shield for a bottled gas tank valve by providing a cover for the valve handle. The cover includes a tail portion which extends outwardly beyond the shield secured to a tank and disposed about the tank valve. There is also a flange or plate within the shield which fits under the valve handle, restricting access to the handle while the shield apparatus is in place. A padlock is inserted through the tail piece outside of the shield and about the valve handle on the top of the tank to prevent the safety shield from being removed from the handle as long as the lock is in place.

Among the objects of the present invention are the following:

To provide new and useful safety shield apparatus for a bottled gas tank valve;

To provide new and useful cover for the valve handle of a gas valve;

To provide new and useful shield apparatus for a propane tank valve which includes a cover portion and a tail portion which extends away from the propane tank;

To provide new and useful cover apparatus for substantially enclosing the handle of a propane tank valve; and To provide a new and useful safety shield for a propane tank valve having a tail piece which receives a padlock for securing the safety shield in place.

BRIEF DESCRIPTION OF THE DRAWING

FIG. 1 is a perspective view of the apparatus of the present invention in its use environment.

FIG. 2 is a view in partial section taken generally along line 2—2 of FIG. 1.

FIG. 3 is a bottom view of the apparatus of the present invention with its use environment shown in dash/dot lines.

FIG. 4 is a view in partial section taken generally along line 4—4 of FIG. 3.

FIG. 5 is a view in partial section sequentially illustrating the installation of the apparatus of the present invention.

FIG. 6 is a side view in partial section sequentially following FIG. 5 and illustrating the continuing installation of the apparatus of the present invention.

DESCRIPTION OF THE PREFERRED EMBODIMENT

FIG. 1 is a perspective view of safety shield apparatus 30 of the present invention disposed in its use environment, which includes a propane tank 2. The propane tank 2 includes a valve 4, only a portion of which is illustrated in FIG. 1. Extending upwardly from the top of the propane tank 2 is a valve protective flange or shield 10. The valve protective flange or shield 10 is appropriately secured, as by welding, to the tank 2. The flange 10 extends about the valve 4 for less than 360 degrees. There is an opening 12 between the ends of the protective flange to allow access to the valve 4.

Extending through the flange 10 are typically three apertures, including a central aperture 14, and a pair of side apertures 16 and 18. In FIG. 1, the central aperture 14 is illustrated as being round. The side apertures 16 and 18 are illustrated as being generally rectangular. Obviously, the opening or aperture 14 may also be rectangular in some cases. The side apertures 16 and 18 generally comprise hand holds for carrying the tank 2. The central aperture 14 is generally aligned with the opening 12.

FIG. 2 is a view in partial section taken generally along line 2—2 of FIG. 1, illustrating the safety shield apparatus 30 in its use environment. FIG. 3 is a bottom view of the safety shield apparatus 30 in its use environment, and taken generally along line 3—3 of FIG. 2. FIG. 4 is a view in partial section through the safety shield 30 taken generally along line 4—4 of FIG. 3. FIGS. 2, 3, and 4, illustrate the safety shield 30 in place on the valve 4 of the tank 2. FIGS. 5 and 6, which are sequential views in partial section, illustrate the installation of the safety shield 30.

For the following discussion, reference will be made to all of the Figs. in general. Appropriate reference to a specific Fig. will be made as required.

As best shown in FIGS. 5 and 6, the valve 4 includes a handle 6. The safety shield apparatus 30 includes two portions, a cap portion 32 and a tail portion 50. The cap portion 32 is disposed over the handle 6 to prevent the handle 6 from being inadvertently turned to open the valve 4.

As indicated above, the safety shield apparatus 30 includes two portions, a cap portion 32 and a tail portion 50. The cap portion 32 fits over the handle 6 of the valve 4 to prevent inadvertent opening of the valve 4 by rotating the handle 6. The tail portion 50 extends through the opening 14 and outwardly from the protective flange 10.

The cap portion 32 includes a top wall 34, a front wall 36, and a pair of side walls 40 and 42. Extending rearwardly from the bottom of the front wall 36, remote from or spaced apart from the top wall 34, is a bottom flange 38. The flange 38 extends rearwardly, generally parallel to the top wall 34. The flange 38 terminates adjacent to the handle 6. The front wall 36 and the side walls 40 and 42 are appropriately secured to the top wall 34.

A sloping rear wall 44 is also secured to both the top wall 34 and the side walls 40 and 42. The rear wall 44 extends to the tail portion 50. The side walls 40 and 42 also extend to the tail portion 50, and, as best shown in FIG. 3, the side walls 40 and 42 curve inwardly to the tail portion 50. Similarly, the rear wall 44 tapers downwardly and rearwardly to join the tail portion 50.

The five walls 34, 36, 40, 42, and 44 define a chamber 46 which relieves the handle 6 of the valve 4. The flange 38 comprises a bottom front "floor" of the chamber 46 beneath a portion of the handle 6.

The tail portion 50 is a generally solid or barreled element. The tail portion 50 includes a generally rounded top surface 52, a generally flat or planer bottom surface 54, and a pair of generally flat side surfaces 56 and 58. The side surfaces 56 and 58 are generally parallel to each other.

The top surface 52 and the side surfaces 56 and 58 extend to a generally flat end surface 60.

A pair of transversely extending apertures or bores 62 and 64 extend through the tail portion 50. The apertures or bores 62 and 64 are generally parallel to each other and are spaced apart from each other. They extend between the side surfaces 56 and 58 of the tail portion 50.

The reason for having at least two apertures or bores is to enable the safety shield apparatus to be used with tanks of various sizes. The bores receive the shackle of a lock. Shown in FIG. 1 is a padlock 70. The padlock 70 includes a case 72 and a shackle 74. In FIGS. 2 and 3, the shackle 74 is shown in dash/dot line extending through the bore 64. In FIG. 1, the shackle 74 is shown extending through the bore 62. The shackle is preferably horizontally disposed to prevent the lock from being manipulated through the aperture 14.

It will be noted that the apparatus 30 is referred to as a safety shield. The purpose of the shield is for safety reasons, not security reasons. The purpose of the lock 70 is for securely locking the safety shield apparatus 30 over the handle 6 of the valve 4. With the shackle 74 of the lock extending through the bore closest to the flange 10, the safety shield may not be removed from covering the handle 6 by a child, or by someone not authorized to do so.

FIGS. 5 and 6 indicate sequentially the installation of the safety shield apparatus 30 over the handle 6 of the valve 4. In FIG. 5, the cap portion of the safety shield apparatus 32 is disposed above the handle 6, with the tail portion 50 disposed adjacent to the aperture 14. The tail portion 50 is placed into the aperture 14 and is moved therethrough, at the same time the cap portion 32 is moved downwardly over the handle 6, as indicated by the curved arrow in FIG. 6. With the cap portion 32 disposed over the handle 6 as shown in FIG. 6, the tail portion is moved outwardly through the aperture 14 until the flange 38 is disposed beneath the handle 6. See FIGS. 2 and 3. The padlock 70 is then secured to the tail 50 adjacent to the vertical flange 10.

In FIGS. 2 and 3, it is graphically illustrated that the padlock 70 prevents the apparatus 30 from being moved away from the handle 6. The flange 38 is disposed beneath the handle 6, preventing access to the handle 6. Accordingly, the handle 6 cannot be inadvertently rotated to open the valve 4.

To provide access to the handle 6, the reverse procedure from that illustrated in FIGS. 5 and 6 is accomplished. The padlock 70 is first removed from the tail portion 50, and the safety shield apparatus 30 is then moved inwardly and upwardly until the flange 38 is free from the handle 6. The cap portion 32 of the safety shield apparatus 30 is then moved upwardly, in the reverse direction from the curved arrow illustrated in FIG. 6, to the position shown in FIG. 5. The forward and upward movement of the apparatus 30 then allows the tail portion 50 to be withdrawn from the aperture 14, and the safety shield apparatus 30 is then removed from the propane tank 2 and its valve 4.

While the principles of the invention have been made clear in illustrative embodiments, without departing from those principles, there may occur to those skilled in the art modifications of structure, arrangement, proportions, the elements, materials, and components used in the practice of the invention, and otherwise, which are particularly adapted to specific environments and operative requirements. The appended claims are intended to cover and embrace any and all such modifications, within the limits only of the true spirit and scope of the invention.

What is claimed is:

1. Safety shield apparatus for a valve on a bottled gas tank, which tank includes a vertical flange secured to the tank and disposed about the valve and which vertical flange includes at least a single aperture extending through the vertical flange and which valve includes a handle, the safety shield apparatus comprising in combination:

cap means comprising top and peripheral wall portions; and said peripheral wall portion including front and rear portions for receiving the handle on the valve;

a cap flange connecting to said front wall portion and extending beneath the handle and terminating adjacent to the handle;

tail means securing to said rear wall portion and extending through the aperture for securing the cap means to the tank; and means for securing the tail means adjacent to the vertical flange and remote from the cap means to secure the cap means to the tank.

2. The apparatus of claim 1 in which the tail means includes a tail extending through the aperture in the vertical flange.

3. The apparatus of claim 2 in which the tail means further includes an aperture extending through the tail for receiving the means for securing the tail means adjacent to the vertical flange.

4. The apparatus of claim 3 in which the means for securing the tail means to the vertical flange includes a padlock having a shackle extending through the aperture in the tail.

5. The apparatus of claim 1 in which the cap means includes a top wall, a front wall, a rear wall and a pair of side walls secured to the top wall, the front wall, and the rear wall, which walls define a chamber for receiving the handle of the valve.

6. The apparatus of claim 5 in which the cap flange is secured to the front wall and to the side walls.

7. The apparatus of claim 1 in which the tail means comprises a generally solid tail element secured to the rear wall and to the side walls.

8. The apparatus of claim 7 in which the tail means includes at least a single bore extending transversely through the tail element adjacent to the aperture in the vertical flange and outwardly the cap means.

9. The apparatus of claim 8 in which the means for securing the tail means to the flange includes a shackle element extending through the bore to prevent the tail means from moving through the aperture in the vertical flange.

10. Safety shield apparatus for a bottled gas tank having a valve, a handle for opening and closing the valve, a vertical safety flange secured to the tank and disposed about the valve, and at least a single aperture extending through the vertical flange, the safety shield apparatus comprising in combination:

cap means comprising top and peripheral wall portions; and said peripheral wall portion including front and rear portions for receiving the handle on the valve; and tail means including a relatively solid tail element having at least a single aperture for receiving a shackle of a padlock secured to said rear wall portion and extending through the aperture in the vertical safety flange for securing the cap means about the handle of the valve.

11. The apparatus of claim 10 in which the cap means includes a flange disposed beneath the handle.

12. The apparatus of claim 10 in which the cap means includes a front wall, a top wall, a rear wall, and a pair of spaced apart side walls connected to the front wall, the top wall, and the rear wall.

13. The apparatus of claim 12 in which the cap means further includes a flange secured to the front wall and to the side walls and generally parallel to the top wall and disposed beneath the cap.

14. The apparatus of claim 11 in which the flange terminates adjacent to the handle.

* * * * *